United States Patent

[11] 3,582,787

[72] Inventors Jean Jacques Muller
Garches;
Michel Revel-Mouroz, Boulogne, both of, France

[21] Appl. No. 776,196
[22] Filed Nov. 15, 1968
[45] Patented June 1, 1971
[73] Assignee International Standard Elctric Corporation
New York, N.Y.
[32] Priority Nov. 17, 1967
[33] France
[31] 128,688

[54] MOBIL RADIOTELEPHONE COMMUNICATIONS SYSTEMS
5 Claims, 3 Drawing Figs.

[52] U.S. Cl. .......... 325/53, 179/41, 325/55, 340/171, 343/200
[51] Int. Cl. .......... H04b 1/00
[50] Field of Search .......... 325/16, 51, 53, 54, 55, 57; 179/41 A; 340/171; 343/200, 201, 205

[56] References Cited

UNITED STATES PATENTS

| | | | |
|---|---|---|---|
| 2,629,092 | 2/1953 | Herrick .......... | 179/41 |
| 3,140,468 | 7/1964 | Blaisdell et al. .......... | 340/171 |
| 3,310,741 | 3/1967 | Uitermark et al. .......... | 325/51X |

*Primary Examiner*—Robert L. Griffin
*Assistant Examiner*—R. S. Bell
*Attorneys*—C. Cornell Remsen, Jr., Walter J. Baum, Percy L. Lantzy, J. Warren Whitesel, Delbert P. Warner and James B. Raden

ABSTRACT: A mobile radio-telephone system is supplied which employs a chain or network of land-based radio stations. Different groups of service and communications channels are used by adjacent ones of the land-based radio stations. The mobile stations incorporate means to search for and distinguish between the channels so that a particular group of service and communication channels associated with a given land-based radio station are sought out and used by the mobile.

Figures 1, 2:
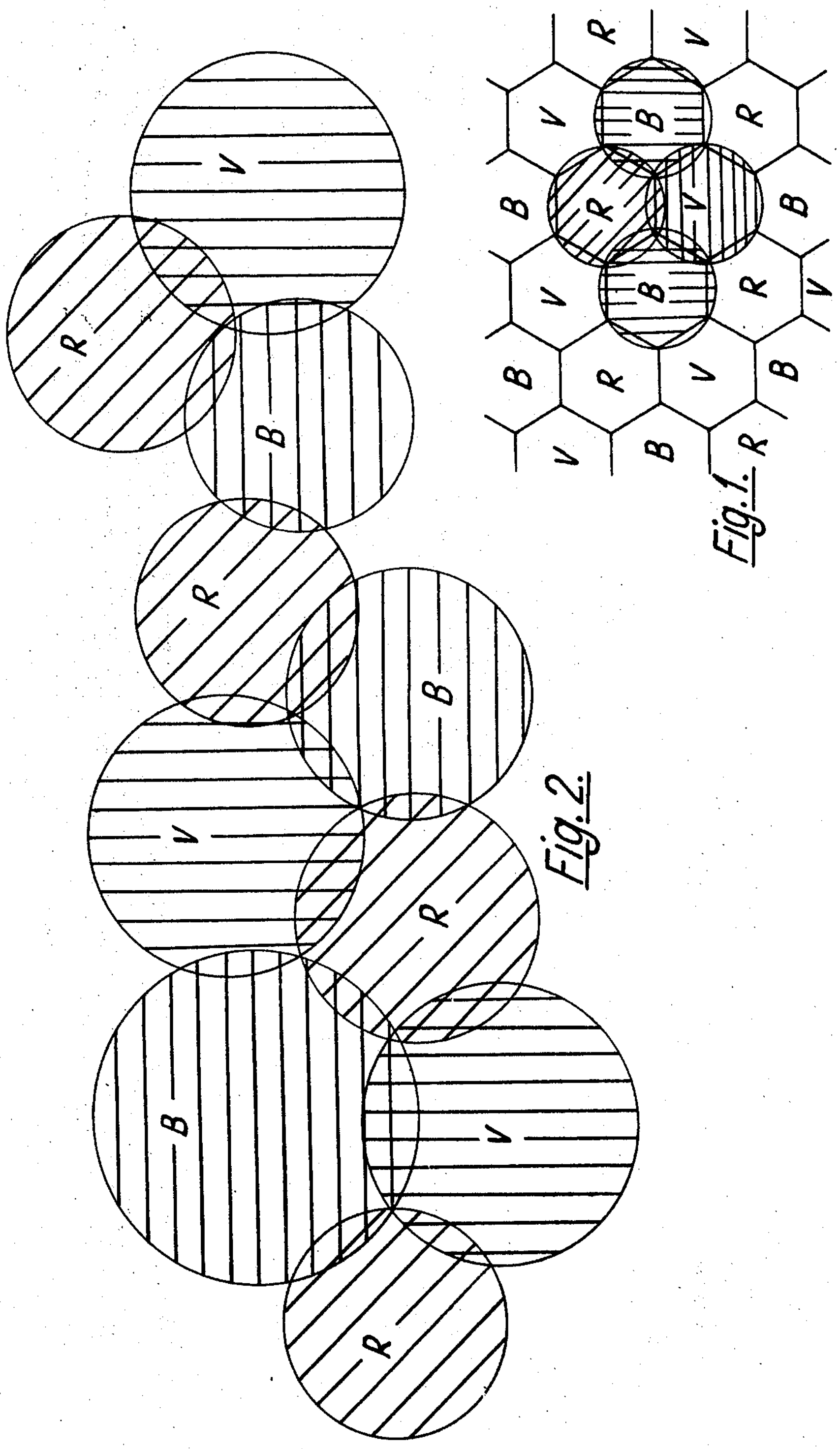

Inventors
J. T. MULLER M. REVEL-MOUROZ
By O. O. Warner
Attorney

MOBIL RADIOTELEPHONE COMMUNICATIONS SYSTEMS

The present invention relates to a radio communication system between a telephone network and two types of mobile sets, i.e. mobile radio telephone sets (transceivers) and paging receivers (receivers only). In this system, a service channel is provided. The service channel is assigned to selective terminating calls addressed to both types of mobile sets. The service channel of each individual radio telephone station is defined by its radio frequency and need not be marked. The mobile sets, in their standby condition are automatically directed to this service channel, and the paging receivers have built-in tuning to this radio frequency.

This invention relates to improvements over patent application Ser. No. 737,963 which was filed on June 18, 1968, in the name of J. J. Muller and entitled "Mobile Radio Telephone and Paging System."

A principal object of the present invention is to adapt a system such as that disclosed in the above-identified patent application to length-extended or area-extended links served by a chain or a network of radio telephone stations. The use of the same radio frequency for the service channels of all stations, i.e. the use of the same channel for selective terminating calls sent out by all the stations, could give rise to troublesome interference between neighboring stations. Moreover, a mobile set located between two stations can receive calls from both stations. In order to overcome this ambiguity, the selective call must be accompanied by information which indicates to the mobile set the channel to which it should switch. For instance, the station will broadcast four digits for the selective call, plus two digits identifying the channel to be seized. Thus, the information on the channel to be seized will increase by half the traffic on the service channel. When the link is only made with the mobile radio telephone set, traffic of selective calls is extremely low compared with call traffic. The increase in traffic on the service channel mentioned above is unimportant and the risk of interference between two neighboring stations on the same service channel (mentioned above) is negligible. This does not apply in the case of a link to be made also with paging receivers to which selective calls are addressed on the same service channel as the mobile sets.

The busy time of the service channel can be fairly long, and the risk of interference between two neighboring stations making selective calls simultaneously cannot be neglected.

According to a feature of the present invention, in the communications system stated above, a small number of different service channels are provided. For instance, two channels are supplied for a length-extended link served by a chain of stations, or three channels for an area-extended link served by a network of stations. The said channels are assigned to various stations in such a way that neighboring stations have different service channels. The conversation channels are distributed in different groups of channels, associated with different service channels and assigned to the same stations. The mobile sets are equipped with means to tune in to an available conversation channel of the group which is associated with the service channel on which the mobile set received the selective call.

According to another feature of he invention, the different service channels are marked with different tones, and the mobile sets are equipped with means to recognize the said tones and with means to tune-in to an available conversation channel in the group indicated by the marking tone of the service channel. In a variant, the marking tone may, however, be the same on all service channels. In this case the mobile sets are equipped with means to recognize the service channels according to their different radio frequencies.

Moreover, when a mobile set tunes-in to an available conversation channel according to numerical information which indicates this channel (switching order), if effects a "forced selection" operation. It is preferable to attain the same result by a searching operation, or "free selection," which can be conducted with simpler means.

Thus according to another feature of the invention, the available conversation channels in the various groups are marked with different offer tones, associated respectively with the service tones, and the mobile sets are equipped with means adapted to tune-in to an available call channel in the group associated with the service channel, by a searching operation according to the associated offer tone.

The order of the channels in the mobile sets is preferably such that each service channel is followed by its associated group of conversation channels. This arrangement cuts down research time. Moreover, in a variant, the offer tone can be the same for all the groups, and the mobile sets are, in this case, equipped with means for limiting searching for an available conversation channel to the group which follows the service channel on which the set received the selective call (as in a telephone exchange, a free line in a group of lines is searched for according to the number of the first line of the group).

The present invention provides for several modifications as regards paging receivers. According to a feature of the invention, separate paging services are provided for, each one being located in the area of a single radio telephone station. In each separate service, the paging receivers include built-in tuning to the service channel belonging to their station, as stated in patent application Ser. No. 737,963. In that invention, no complications are introduced into the design of the paging receivers, which is sometimes preferable given the present state of the art. The present invention, however, provides for more complicated paging receivers which can be tuned-in to different service channels. In a modification, these devices are equipped with manual tuning means which enable the subscriber to tune his set in to the service channel of the area in which he is located, provided he is able to define this area. In another modification, these devices are equipped with a tone detector whereby the device can be tuned to the service channel which broadcasts its tone either by manual tuning means or by automatic tuning means by searching for one of the possible tones. These modifications can be used separately or in a combination; for instance, a station may have a majority of simple devices attached to it and also have some more complicated devices capable of being called by different stations.

Figure 3:
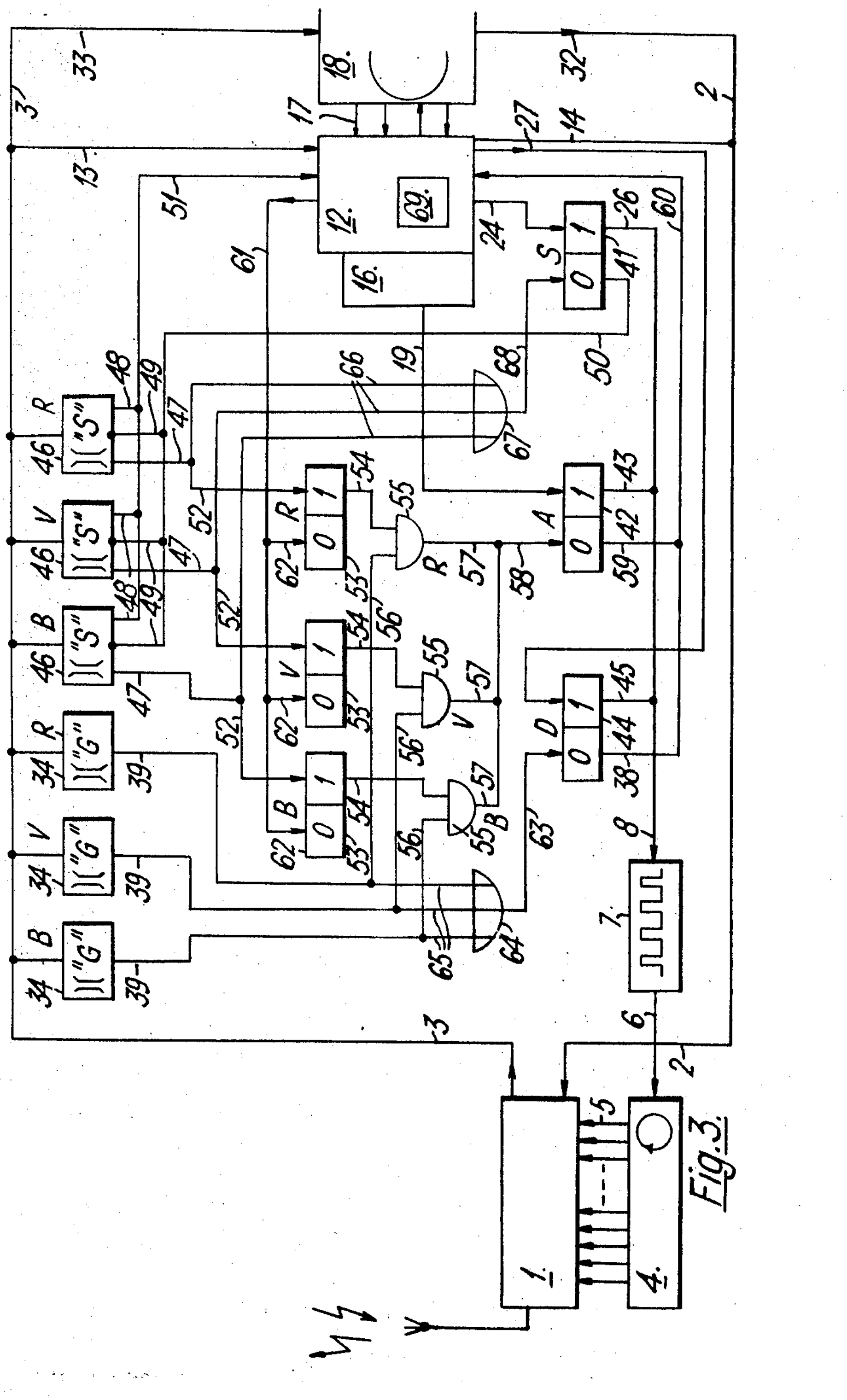

The invention will now be described with specific reference to the appended drawings in which:

FIG. 1 illustrates the principle of area coverage using three different types of link;

FIG. 2 shows a length-extended link which is also partially area-extended, and served by radio telephone stations which employ three groups of different channels, according to the principle laid down in FIG. 1, and FIG. 3 shows a schematic diagram of an embodiment of a mobile radio telephone set in which the service channels are designated by three different markings and the available channels by three different markings in three different groups of channels.

FIG. 1 shows that an area can be covered by three types of zones (B, V and R in the diagram). These links can be arranged in a honeycomb; in this case each B zone, for instance, is surrounded by six zones of the other two types V and R. Two zones of the same type, the two zones B, (shadowed in the diagram) for instance, are completely separated by two zones of the other two types V and R. The overlapping portions between neighboring zones (B+R, B+V, R+V, etc.) can be quite wide, without two zones of the same type (the two B zones for instance) meeting. It is obvious, moreover, that a length-extended area can be covered by alternating zones of two types.

FIG. 2 shows an example of a length-extended and partially area-extended link. The length-extended area (horizontally placed in the diagram) is, in this case, covered by three types of zones instead of two. This is due to the need for area-coverage in certain places.

In a preferred embodiment of the invention, each type of zone is served by a different group of channels and this includes the service channel. However, in addition to the channels assigned to the three types, the link may use supplementary channels in certain heavy traffic areas which do not border on one another.

If it is assumed, for example, that normal areas use three or four call channels or, at most, five, and that the whole communications system has 30 channels at its disposal, the channels can be distributed as follows:

| Group (type) | Service channel | Service marking | Call channels | Offer marking | Suppl. channels |
|---|---|---|---|---|---|
| B.......... | 1 | $f_{s\cdot1}$ | 2–6 | $f_{g\cdot1}$ | Heavy traffic areas. 19–30. |
| V.......... | 7 | $f_{s\cdot2}$ | 8–12 | $f_{g\cdot2}$ | |
| R.......... | 13 | $f_{s\cdot3}$ | 14–18 | $f_{g\cdot3}$ | |

FIG. 3 shows a schematic diagram of a mobile radio telephone set, which is a modification of the schematic diagram in FIG. 5 of the patent application referred to above (Ser. No. 737,639 ), adapted to the present invention and embodying three service markings and three offer markings according to the above table. Similar components in FIG. 3 bear the same references as in application Ser. No. 737,963.

A transceiver 1 (operating in duplex) is connected to a transmitting line 2 and to a receiving line 3. The said transceiver is tuned for radio transmission by means of a ring-counter the outputs 5 of which are connected, for instance to the respective quartz oscillators in the transceiver. Input 6 of counter 4 receives the pulses of a clock 7 which yields pulses at the required rate (for example every 200 milliseconds) when a marking is applied to its input 8.

Three channel searching methods are employed in the embodiment of FIG. 3. The first or "service" method or mode is controlled by a flip-flop 41 ("S") the output "1 " on 26, of which is connected to wire 8. This flip-flop is set upon hook-up after a call, to search for a service channel, or when the mobile set moves into the zone of another station. It is reset to zero to end search operations, once the set has tested any service marking (or "S" tone). The second of the three methods, or the "terminating" search mode is controlled by flip-flop 42 ("A") the output "1 " on 43, of which is also connected to wire 8 ( over line 43). This flip-flop is set at 1 upon decoding of a selective call addressed to the set in question. It is reset to end searching when the set has tested the offer tone "G" of the same type as the marking tone "S" on which the set received the selective call. The third of the three methods referred to, or the "originating" method or mode, is controlled by flip-flop 44 "D" the output "1 " at 45 of which is also connected to wire 8. The said flip-flop is set at "1 " upon off-hook for an originating call in order to search for a call channel. It is reset to end search procedure, when the set has tested any offer tone "G."

Transmission wires 2 and reception wires 3, as in FIG. 5 of patent application Ser. No. 737,963, are connected to a signaller 12 (via branches 14 and 13) and a telephone 18 (via branches 32 and 33). Telephone 18 is connected to the signaller via conventional connections at 17. Signaller 12 is associated with a decoder 16 which is responsive to the call sign of the mobile telephone set in question. Decoder 16 yields a signal at its output 19 when it decodes a selective call addressed to the set in question.

The diagram shows separately six continuous tone filter circuits, to wit: three filter circuits 46 (B, V and R) for the three types of marking tone 37 S," and three filter circuits 34 (B, V and R) for the three types of offer tone "G." Filter circuits 34 each have an output 39 and filter circuits 46 each have two outputs 47 and 48. These filter circuits yield a marking at their respective outputs 39, 47 and 48, when they are testing a continuous tone. Modulated or manipulated tones are detected and suitably translated by signaller 12 in a well-known manner. However, marking filter circuits "S" 46 have a blocking input 49 whereby their output 47 can be blocked. The said inputs 49 are connected from the output "0" 50 of flip-flop "S" 41. Outputs 48 are not affected by this blocking and are connected to an input 51 of signaller 12.

A branch 52 of each output 47 is connected to the input "1" of a flip-flop 53 which is connected to type B, V or R marking tone filter. When the set is in standby condition, it is tuned in to a channel "S" of one type (B, V or R); the three search flip-flops 41, 42 and 44 are reset at "0, " flip-flop 53 of the same type is set at "1 " and the two other type 53 flip-flops are reset at "0. " Outputs "1 " 54 are connected to one input of an AND gate 55 (B, V or R). The said gates have two inputs. The other input of each gate 55 is connected from one branch 56 of output 39 of a filter circuit "G" 34 of the same type (B, V or R). Outputs 57 of the three gates 55 are connected to input "0 " 58 of flip-flop "A" 42. Output 19 of decoder 16 is connected to input "1 " of the said flip-flop.

When the land-based telephone station sends out a selective call ( by manipulating the tone of its service channel "S" with a work tone), signaller 12 receives this call via transceiver 1, branch 3 and branch 13. The decoder 16 compares the received call with the actual call-sign of the set in question. When the call is addressed to the said set, decoder 16 yields a signal at its output 19, which sets at "1 " flip-flop "A" 42. The marking of output "1 " 43 of this flip-flop starts the channel searching devices over wire 8, clock 7, wire 6, counter 4, outputs 5 and transceiver 1. Transceiver device 1 leaves service channel "S" to tune in to a call channel "G" of the same type (B, V or R). When the transceiver device moves on to a channel "S" of another type, filter circuit "S" 46 does not operate because its output 47 is blocked and because input 51 of signaller 12 does not operate at this stage. When device 1 moves on to a "G" channel of another type, filter circuit "G" 34 does not transmit a signal through to the terminating gate 42, because 34 is connected to an AND gate 55 whose other input is not marked. Finally, when device 1 comes on a "G" channel of the same type, it marks input 56 of a gate 55 whose other input 54 is already marked by output "1 " of flip-flop 53 of this same type. The said gate 55 yields a marking over 57 and 58 which resets at zero flip-flop "A" 42. The marking at output "1 " 43 of this flip-flop is thus cut off stopping the search device. Flip-flop 42 yields a passing signal at its output "0 " 59. This output is connected to an input 60 of signaller 12. End of search is thus indicated to the signaller, which reverts to operating its terminating call program. An output 61 of signaller 12 is connected to inputs "0 " 62 of flip-flops 53. The signaller yields a signal at this output, thus resetting at zero flip-flop 53 which was set at "1. "

When the user of mobile set lifts his receiver 18 to make an originating call, signaller 12 yields a signal at its output 27 which is connected to input "1 " of search flip-flop "D" 44. The flip-flop is set at "1 " and yields a marking at its output "1 " 45 connected to wire 8. This starts the search through operation of 7, 4 and 1. Input "0" 63 of this flip-flop is connected to the output of an OR gate 64, which connects to three sources of signals. When transceiver device 1 moves on to, or is returned to, another channel "S," filter circuit "S" 46 does not operate, as was explained above. When device 1 is tuned to a "G" channel of any type (which has the required reception level), filter circuit "G" 34 of this type yields a marking at its output 39. OR gate 64 applies the said marking to input "0 " of flip-flop 44 and resets at zero this flip-flop. The marking at output "1 " of the said flip-flop is cut off, thus ending the search process, Flip-flop 44 yields a passing signal at its output "O " 38, which is connected to input 60 of the signaller 12. The signaller reverts to operating its originating calls program and resets at zero (by a signal at its output 61) flip-flop 53 which had been set at "1. "

Hanging up of the receiver after a call produces a signal at output 24 of signaller 12. This output is connected to input "1 " of flip-flop 41. Flip-flop 41 is then set at "1" and yields a marking at its output "1" 26, which is connected to wire 8. This starts the search device. The reader will appreciate that there can be no transmission to a channel "G." When device 1 moves on to an "S" channel of any type (which has the required reception level), filter circuit "S" 46 of this type yields a marking at outputs 47 and 48. A branch 66 of the three outputs 47 is connected to an input of OR gate 67 which has three inputs. Output 68 of this gate is connected to input "0" of flip-flop "S" 41. The said flip-flop is reset at zero and the marking at its output "1" is cut off, thus bringing the search device to a standstill. Branch 52 of output 47 sets at "1" flip-flop 53 of the corresponding type. Output "0" 50 of flip-flop 41 then blocks output 47 (this blocking effect may comprise delay means whereby the marking at output 47 is afforded the time to set at "1" flip-flop 53 before being cut off by the resetting at zero of flip-flop 41). The set is consequently in a standby condition on a channel "S."

Branch 48 of output 47 (which is not blocked) is connected in signaller 12, to a supervisory device 69. When the marking "S" of a station falls below an acceptable level, supervisory device 69 is energized and controls the search for another channel "S." The signaller yields a signal at its output 24, and the search is effected as described above. Moreover, the signaller yields a signal at its output 61 which resets at zero flip-flop 53 which had been set at "1."

The signalling system for both standby condition and for operation of terminating and originating call programs is indicated by way of example, in the following table. It will be seen that stations use three tones $T_0$ for channels "S," three different tones $T_1$ for channels "G," and a working tone $T_2$, which can be the same in all cases. Each station of a specific type, then, uses three tones $T_0$, $T_1$ and $T_2$. The mobile sets also use three tones $t_1$, $t_2$ and $t_3$ (the latter modulates $t_1$ for the on-hook signal). Thus, mobile sets can receive signals from the stations, but not from other mobile sets.

SERVICE CHANNEL MARKED "S" FOR SELECTIVE TERMINATING CALLS. A CHANNEL MARKED "G" FOR ORIGINATING CALLS AND ALL CONVERSATIONS

| Station program | | Mobile set program |
|---|---|---|
| | Stand-by condition | |
| Service channel marked "S" ($T_0$) free channel marked "G" ($T_1$) | | Stand-by position on the service channel of one type. |
| | Terminating call | |
| Selective call ($T_2$ over $T_0$) | ⟶ | Decoding. |
| | ⟵ | Acknowledgment ($t_1$). |
| Revert to marking "S" ($T_0$) | | Passage to channel "G" of the same type. |
| | ⟵ | Seizure signal ($t_2$, $t_1$, $t_2$). |
| Seizure marking ($T_2$) on busy channel | ⟶ | |
| ("G" marking on another free channel) | | Ready-to-ring condition. |
| Busy channel connected to telephone exchange | | |
| Ringing ($T_1/T_2$ over $T_2$) | ⟶ | |
| | ⟵ | Off-hook (signal $t_2$). |
| Seizure marking stopped and busy channel connected to calling line | | |
| Conversation | | Conversation. |
| Release | | |
| | ⟵ | On-hook (signal $t_1/t_3$) Revert to service channel. |
| Channel freed | | |
| | Originating call | |
| | | Off-hook. |
| | | Passage to a channel "G". |
| | ⟵ | Seizure signal ($t_1$, $t_2$, $t_1$). |
| Marking "G" on busy channel cut out | | |
| (marking "G" on another free channel) | | |
| | ⟵ | Call-sign ($t_2$ over $t_1$). |
| Call-sign return ($T_2$ over $T_1$) | ⟶ | |
| | ⟵ | Acknowledgement ($t_1$). |
| Busy channel connected to telephone exchange | | |
| Register tone | ⟶ | |
| | ⟵ | No requested ($t_2$ over $t_1$ and $t_1$) |
| Search for and connection with subscriber requested | | |
| Conversation | | Conversation. |
| | ⟵ | On-hook (signal $t_1/t_3$). Revert to a service channel. |
| Release Channel freed | | |

It will be noted that a mobile set making an originating call can be tuned in to a channel marked "G" while another set is searching for this channel in order to answer a terminating call. Various steps can be taken to avoid this ambiguity. In the program shown in tabular form above, a set which answers a terminating call sends out a seizure signal $t_2$, $t_1$, $t_2$ and the station answers by substituting a holding marking $T_2$ for the offer marking $T_1$. Using the same program, a set making an originating call sends out a seizure signal $t_1$, $t_2$, $t_1$, and the station answers by cutting out the offer marking $T_1$ without replacing it by another marking. By contrast, a station making a terminating call is ready to replace marking $T_1$ by marking $T_2$ in reply to a seizure signal from the answering set, but it will not cut out marking $T_1$ in reply to another seizure signal from a set which wants to make an originating call. The said set tunes in to channel "G," but it does not receive the agreed signal (suppression of marking); the set therefore does not continue its program but remains in a standby condition. When channel "G" is seized by the set which answers the terminating call, the set making the originating call receives tone $T_2$, and the signaller interprets it by resuming search operations for another channel "G." If the set called by the station fails to reply within a stipulated time (within 3 seconds, for instance), the station drops the call and maintains a marking "G" on the same channel. The station then answers the seizure signal of the set making an originating call. The said set may have waited several seconds before resuming search operations or it may have explored all the channels and have returned to the same channel.

When a station sends out a selective call addressed to a paging receiver which does not answer, the said station keeps its "G" channel available for originating calls.

It will be understood that the embodiment of the invention which has been described above is only an example of means for carrying out the invention and that the latter is not limited by this particular example.

We claim:

1. A mobile communications system comprising a plurality of land-based radio telephone sets providing radio service channels at a plurality of different frequencies, a plurality of mobile radio-telephone sets, first and second filter means forming a part of each of said mobile radio-telephone sets, said first filter means permitting the passage of signals of two different frequencies representing the signals of first and second service channels, said second filter means permitting the passage of signals of two different frequencies representing first and second conversation channels paired in groups with the first and second service channels, and means associated with each mobile radio-telephone set to search for an available conversation channel in a group associated with the particular service channel over which the set has received a selective call addressed to it.

2. A communications system as claimed in claim 1, in which the different service channels are marked with different marking tones, and the mobile sets are equipped with means to recognize these tones whereby they can search for an available conversation channel in the group associated with the service channel according to the tone of the said service channel.

3. A communications system as claimed in claim 1, in which the available conversation channels in the different groups are marked with different offer tones, and the mobile sets are equipped with means to recognize these tones whereby they can recognize the group associated with each service channel.

4. A communications system as claimed in claim 1, in which the order to the channels in the mobile sets is such that each service channel is followed by a group of associated conversation channels.

5. A communications system as claimed in claim 1, including paging receiver service arranged in separate zones, each service including a paging receiver attached to a single station and having built-in tuning to the radio frequency of its service channel.